US009419455B2

(12) United States Patent
Wang et al.

(10) Patent No.: US 9,419,455 B2
(45) Date of Patent: Aug. 16, 2016

(54) MULTIMODE BATTERY CHARGER

(71) Applicant: BROADCOM CORPORATION, Irvine, CA (US)

(72) Inventors: Xuezhen Wang, Fort Collins, CO (US); Russell Eliot Radke, Fort Collins, CO (US); Kerry Alan Thompson, Fort Collins, CO (US)

(73) Assignee: BROADCOM CORPORATION, Irvine, CA (US)

( * ) Notice: Subject to any disclaimer, the term of this patent is extended or adjusted under 35 U.S.C. 154(b) by 229 days.

(21) Appl. No.: 14/041,622

(22) Filed: Sep. 30, 2013

(65) Prior Publication Data

US 2015/0069951 A1    Mar. 12, 2015

Related U.S. Application Data

(60) Provisional application No. 61/874,723, filed on Sep. 6, 2013.

(51) Int. Cl.
*H02J 7/00* (2006.01)

(52) U.S. Cl.
CPC ............. *H02J 7/0052* (2013.01); *H02J 7/0093* (2013.01); *H02J 2007/0096* (2013.01)

(58) Field of Classification Search
CPC ...... Y02E 60/12; H02J 7/0042; H02J 7/0045; H02J 7/0022; H02J 7/0068; H02J 7/0073; H02J 7/0022; H02J 7/0031; H01M 10/44; H01M 10/46; Y02T 10/7005; Y02T 90/121
USPC ......................................... 320/107, 137, 138
See application file for complete search history.

(56) References Cited

U.S. PATENT DOCUMENTS

| 5,568,044 | A  | * | 10/1996 | Bittner | ........................... 323/272 |
| 5,710,506 | A  | * | 1/1998  | Broell et al. | ................... 320/145 |
| 6,252,373 | B1 | * | 6/2001  | Stefansson et al. | ........... 320/106 |
| 7,656,127 | B1 | * | 2/2010  | Shutt et al. | ..................... 320/134 |
| 2003/0006737 | A1 | * | 1/2003 | LaFollette et al. | ............ 320/137 |
| 2007/0278994 | A1 | * | 12/2007 | Mayega | ................ H02J 7/0072 320/107 |
| 2008/0074096 | A1 | * | 3/2008 | Nishida | ......................... 323/284 |
| 2010/0127666 | A1 | * | 5/2010 | Ball | ............................... 320/152 |
| 2011/0084667 | A1 | * | 4/2011 | Li | .......................... H02J 7/0029 320/145 |
| 2013/0106374 | A1 | * | 5/2013 | Ball | .............................. 323/271 |
| 2014/0184173 | A1 | * | 7/2014 | Szepesi | ................. H02J 7/0068 320/164 |

* cited by examiner

*Primary Examiner* — Richard Isla Rodas
*Assistant Examiner* — Mohammed J Sharief
(74) *Attorney, Agent, or Firm* — Garlick & Markison; Randy W. Lacasse

(57) ABSTRACT

A multimode battery charger circuit supporting switch mode and linear mode charging operations. In various embodiments, the multimode battery charging circuit includes mode control circuitry, a linear gate driver, a pulse width modulation (PWM) control circuit, a programmable constant current control loop circuit, and a programmable constant voltage control loop circuit. In operation, the mode control circuitry receives a charge mode indication signal corresponding to a desired charge mode. Based on this signal, the mode control circuitry enables either the linear gate driver or PWM control circuit to provide control signals to output transistors coupled between an adapter power port and a battery pack, thereby supporting a plurality of charging modes. In some embodiments, one or more of the output transistors are formed on a common substrate with the multimode battery charger circuit.

20 Claims, 7 Drawing Sheets

MULTIMODE BATTERY CHARGER

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/874,723, entitled "MULTIMODE BATTERY CHARGER," filed Sep. 6, 2013.

BACKGROUND

1. Technical Field

The disclosure relates generally to battery powered devices and, more particularly, it relates to multimode battery charger circuitry for use in such devices.

2. Description of Related Art

Battery-powered electronic devices, such as smart phones, tablet computing devices and laptop computers, typically include a power management unit (PMU) having a battery charger for charging an internal battery. In general, there are two principal types of battery charger designs, switching (or switch) chargers and linear chargers. Each type may utilize a variety of topologies, especially in complex mobile and tablet devices with Charge and Play (CnP) or similar options.

In such systems, the battery charger is designed to operate as either a switching charger or a linear charger, and the complex current and voltage control blocks used in one charger type typically will not work in a different type. Further, changes in a system's requirements often require a new battery charger design. For example, if a system requires additional power, external (to an integrated circuit) power transistors may become necessary, thereby requiring design modifications to the battery charger architecture.

DETAILED DESCRIPTION

In various embodiments of the battery charger technology described herein, systems and methodologies are provided to support a plurality of operating/charging modes. In application, multimode charging architectures according to the disclosure permit design optimization and adaptability to support different battery configurations and charging modes of operation (e.g., switch modes and linear modes). In some embodiments, operating modes may be changed in real time or near real time. Further, through sharing of common circuitry, a reduction in semiconductor die area and power consumption can be achieved.

Figure 1:
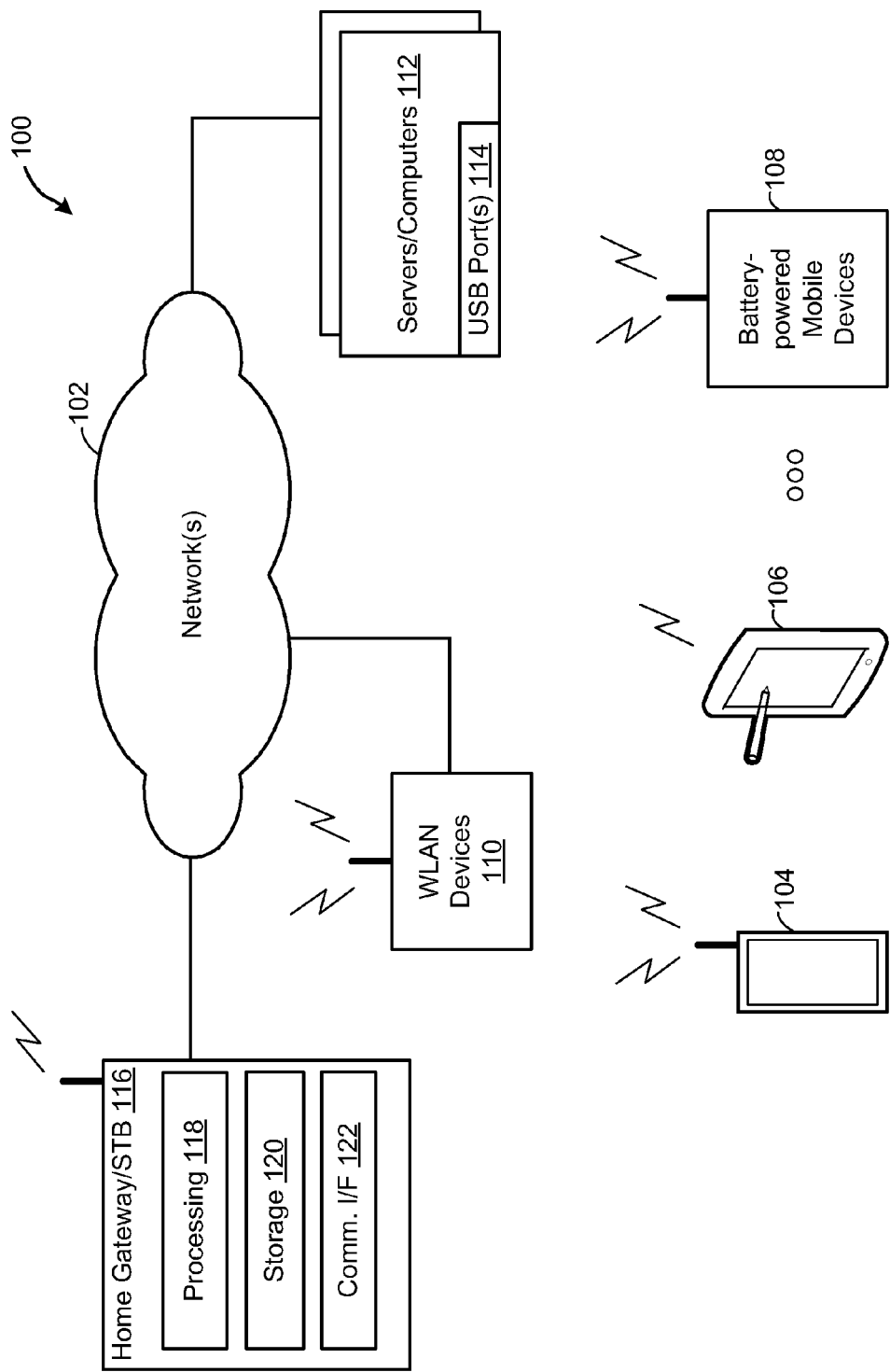
FIG. 1 illustrates an example network having devices with multimode battery charger circuitry in accordance with embodiments of the present disclosure.

FIG. 1 illustrates an example system 100 having devices with multimode battery charger circuitry in accordance with embodiments of the present disclosure. The illustrated system includes one or more communications network(s) 102, one or more smartphones 104, one or more tablet devices 106 and/or other battery-powered mobile devices (e.g., laptop computers) 108, wireless LAN (WLAN) devices 110, and servers/computers 112. In the illustrated system 100, a home gateway/set top box (STB) 116 is also provided, and includes processing 118, storage 120, and communication interface 122 resources. The home gateway/STB 116 may service, for example, a coupled entertainment system. Servers/computers 112 may support various local, distributed and/or cloud-based services and processing operations. The servers/computers 112 may store media and advertising content, user data, profile information, etc.

The communication network(s) 102 may include one or more of the Internet, the World Wide Web (WWW), one or more Local Area Networks (LANs), one or more Wide Area Networks (WANs), one or more Personal Area Networks (PANs), one or more cellular communication networks, one or more Metropolitan Area Networks, Heterogeneous Networks (HetNets), and/or other types of networks. These network(s) 102 may service one or both of wired and/or wireless communications, and serve to support communications among various system components.

Referring more specifically to the mobile devices 104-108, such battery-powered devices are manufactured using integrated circuits, which typically include a power management unit (PMU) having battery charger circuitry. The batteries in these devices may be charged by internal battery charging circuitry through the use of external adapters (such as a wall adapter) and other devices. For example, certain devices may incorporate the ability to receive power through a Universal Serial Bus (USB) connection coupled to USB port(s) 114 of servers/computers 112 or other devices.

As noted, the power requirements and battery technology of mobile devices 104-108 may vary greatly. In order to overcome related design challenges and/or for other reasons, multimode battery charger circuitry according to one or more embodiments of the present disclosure (described in more detail with reference to FIGS. 2-5) is incorporated in such devices.

In addition, while certain embodiments of the disclosure presented herein are described for use in mobile communication devices, various aspects and principles, and their equivalents, can also be extended generally to other types of devices that are designed to rely, at least in part, on battery power. In some instances, structures and components described herein are illustrated in block diagram form in order to avoid obscuring the concepts of the subject technology.

Figure 2:
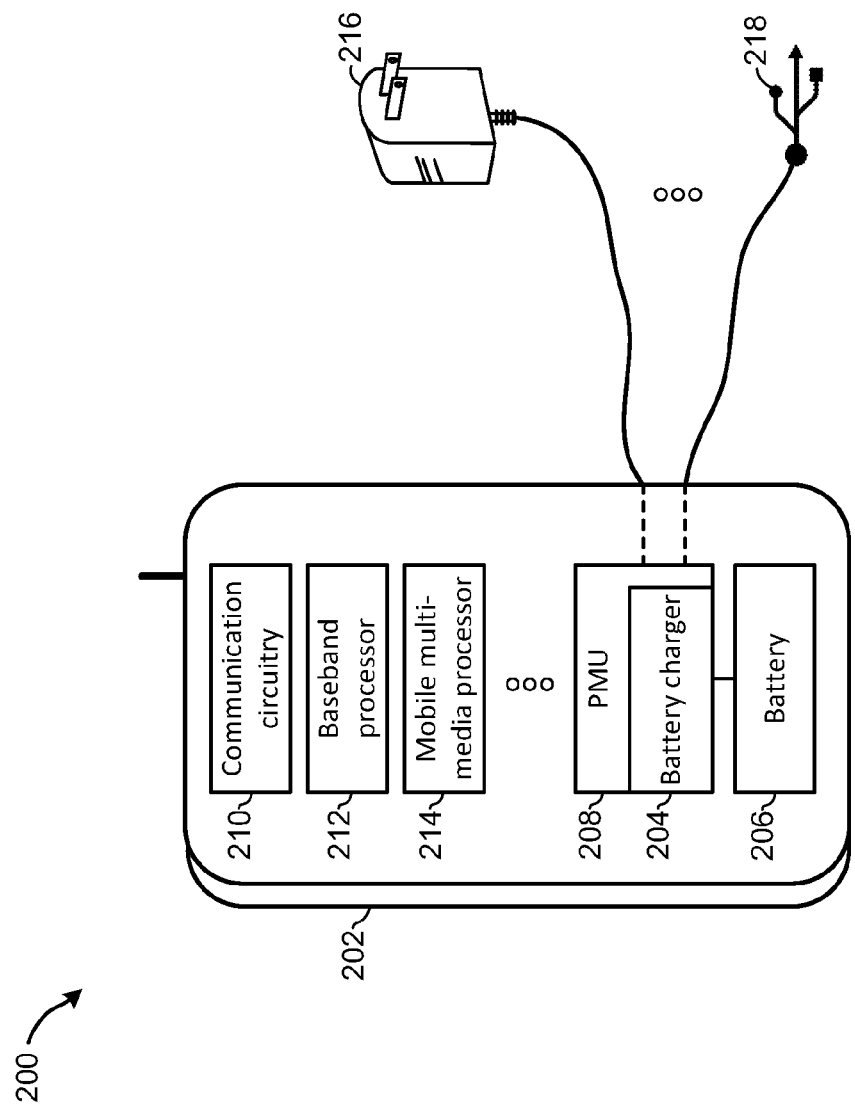
FIG. 2 is a functional block diagram representation of a mobile device incorporating exemplary multimode battery charger circuitry.

Referring now to FIG. 2, a functional block diagram representation 200 of a mobile device 202 incorporating exemplary multimode battery charger circuitry is shown. In this embodiment, the mobile device 202 (e.g., a smartphone, tablet device, portable navigation device, personal media player, handheld game console, etc.) includes multimode battery charger circuitry 204 for charging an internal battery 206. The multimode battery charger circuitry 204 may be integrated in a device such as a PMU 208, formed from one or more standalone integrated circuit devices, or various combinations thereof. As described in greater detail below, the multimode battery charger circuitry 204 may utilize various combinations of integrated or discrete output components such as transistors, capacitors and inductors.

The mobile device 202 may include a wide range of additional components and functionality, some or all of which may receive power from the battery 206 during mobile operation. By way of example and without limitation, communication circuitry 210, a baseband processor 212, and a mobile multi-media processor 214 are provided to enable communications and other functionality of the illustrated mobile device 202.

The mobile device further includes one or more proprietary or standardized power ports (or general purpose ports capable of supporting charging operations) for coupling to a power source to provide power for use by the multimode battery charger circuit 204. In some embodiments, such power sources include an AC power adapter 216 that plugs into a wall outlet and provides a regulated DC output voltage. A standardized connection, such as a USB-compliant link 218, may be utilized in lieu of or in addition to other power sources.

Figure 3:
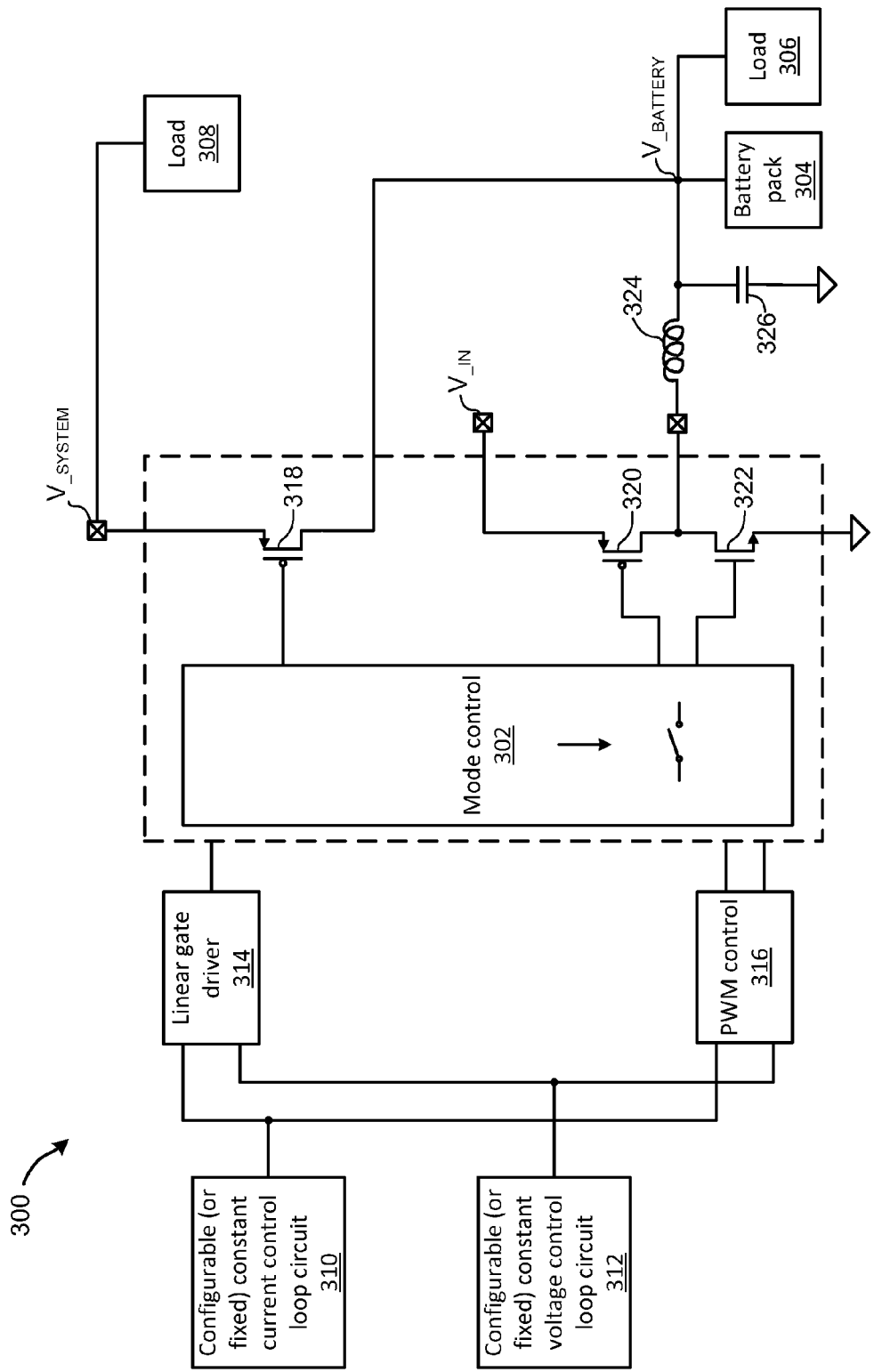
FIG. 3 is a schematic block diagram of an exemplary multimode battery charger circuit.

FIG. 3 is a schematic block diagram of an exemplary multimode battery charger circuit 300. In the illustrated embodiment, mode control circuitry (or module) 302 operates to selectively enable/disable circuit elements necessary to operate in either a switch mode or linear mode of charging when performing charging operations on a battery pack 304. The mode control circuitry 302 may comprise, for example, a plurality of switches responsive to one or more charge mode indication signals. As will be appreciated, the charge mode indication signals can change in real-time or near real-time to support adaptive charge mode transitions.

The illustrated multimode battery charger circuit 300 further includes a configurable constant current control loop circuit 310 and a configurable constant voltage control loop circuit 312, each of which may be coupled to a linear gate driver 314 and a pulse width modulation (PWM) control circuit 316. The currents and voltages produced by the configurable constant current control loop circuit 310 and configurable constant voltage control loop circuit 312 are utilized in generating (via linear gate driver 314 and PWM control circuit 316) the desired control signals at the gates of output transistors 318-322, and are configurable to support a plurality of linear modes of operation and a plurality of switch modes of operation. In some alternate embodiments, the constant current control loop 310 and constant voltage control loop 312 may be fixed to support specific modes of operation.

In various embodiments, the output transistors 318-322 may be implemented utilizing n-channel field effect transistors (NFETs) and p-channel field effect transistors (PFETs) manufactured in a complementary metal oxide semiconductor (CMOS) process. For example, output (or pass) transistor 318 and output transistor 320 are shown as a PFETs, while output transistor 322 is an NFET. In alternate embodiments, and in view of cost and/or power considerations, one or more of the output transistors may be bipolar transistors and/or external to an integrated circuit device containing other charger elements.

When the multimode battery charger circuit 300 is configured to operate in a linear mode (as described in greater detail below in conjunction with FIG. 4), the linear gate driver 314 generates an output voltage that is provided to the gate of pass transistor 318, which is coupled between a system load 308 and a terminal ($V_{\_BATTERY}$) of the battery pack 304. In the illustrated embodiment, system load 308 is powered by a system level supply ($V_{\_SYSTEM}$).

When the multimode battery charger circuit 300 is configured to operate in a pulse mode (as described in greater detail below in conjunction with FIG. 5), the PWM control circuit 316 generates at least one output to control power provided by output transistors 320 and 322. The output transistors 320 and 322 of this embodiment are coupled in series between an adapter power port ($V_{\_IN}$) and ground, while the common drain/source is coupled to a battery terminal ($V_{\_BATTERY}$) for charging and receiving power from the battery pack 304, as well as powering other system components represented by load 306, via an external or internal inductor 324. A capacitor 326 is coupled between $V_{\_BATTERY}$ and ground and, in conjunction with inductor 324, forms a passive low-pass LC filter that attenuates switching harmonics and passes DC voltages.

The battery pack 304 may have a variety of configurations and include a variety of battery types. For example, the rechargeable battery pack 304 may be comprised of a single cell battery, a series dual-cell battery, etc., and utilize different types of batteries, such as lithium-ion batteries, thin film lithium-ion batteries, lithium-polymer batteries, etc. Selection of charging modes may, in some cases, depend on the type of battery that is utilized.

Further, the configurable constant current control loop circuit 310 and configurable constant voltage control loop circuit 312 may be implemented using a variety of architectures. In one exemplary embodiment, the configurable constant current control loop circuit 310 utilizes a current reference and sensing circuit (with additional components in the case of an external pass transistor), a programmable gain stage and a programmable output filter. Likewise, the constant voltage control loop circuit 312 may utilize a voltage reference and sensing circuit, a programmable gain stage and a programmable output filter. Depending on the selected mode of operation, one or more of such elements may be selectively enabled or disabled by the mode control circuitry 302.

Figure 4:
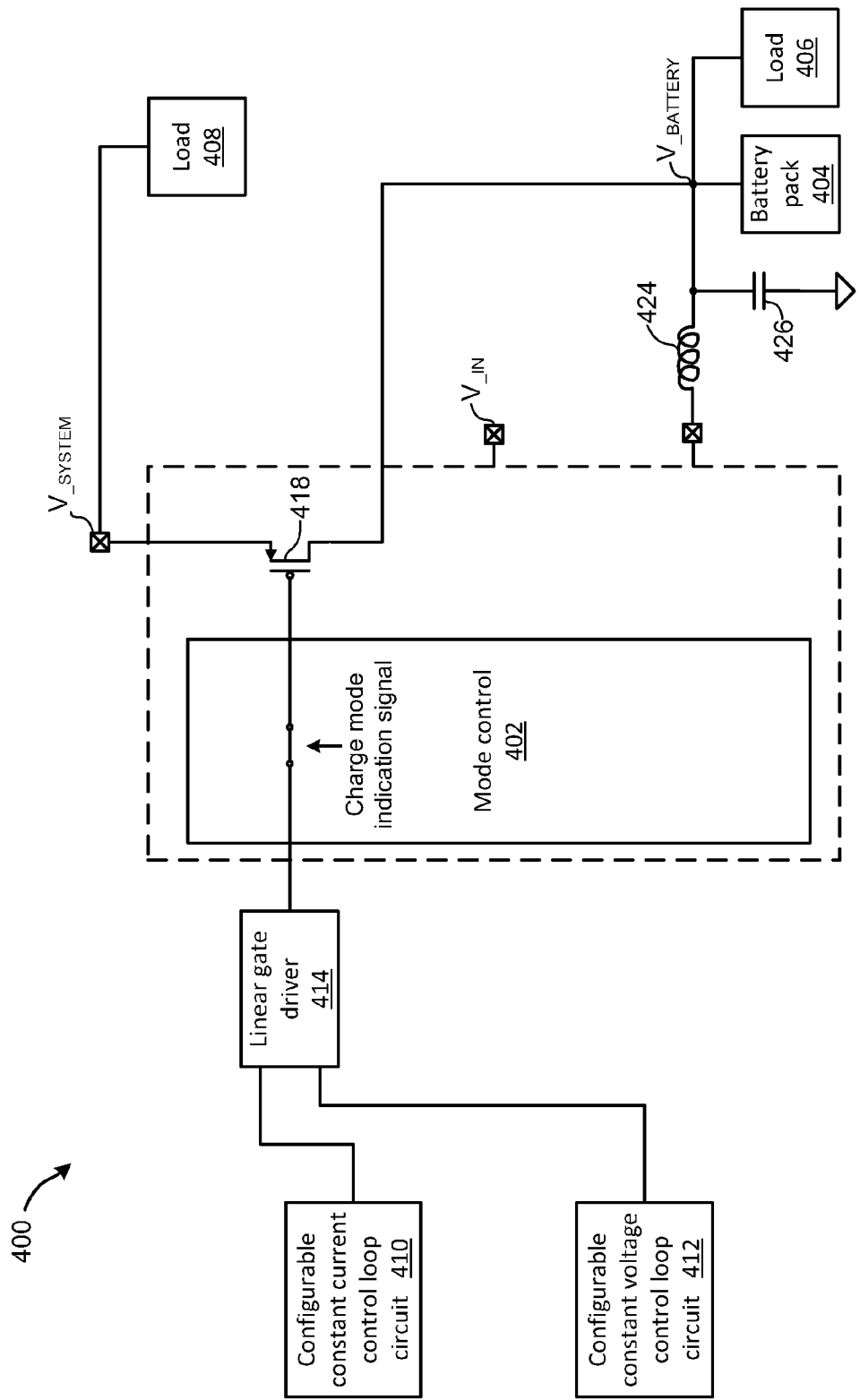
FIG. 4 illustrates the exemplary multimode battery charger circuit of FIG. 3 configured to operate as a linear charger.

FIG. 4 illustrates the exemplary multimode battery charger circuit of FIG. 3 configured to operate as a linear charger 400. In this embodiment, the mode control circuitry 402 enables the signal path of the internal/external pass transistor 418 for charging of battery pack 404. In particular, and in accordance with one or more charge mode indication signals, the mode control circuitry 402 enables (e.g., by closing and/or opening one or more switches) charging control voltages from the linear gate driver 414 to be received at the gate of the pass transistor 418.

Further, the mode control circuitry 402 may configure (e.g., by generating appropriate gate control voltages for a plurality of additional switches) the configurable constant current control loop circuit 410 and configurable constant voltage control loop circuit 412 such that the currents and voltages generated by these circuits are able to effectively control the linear gate driver 414 and pass transistor 418. In the illustrated embodiment, the PWM control circuit and related output transistors (not shown) are disabled. The remaining illustrated elements 406, 408, 424 and 426 generally function in a like manner to the corresponding elements described in conjunction with FIG. 3.

Figure 5:
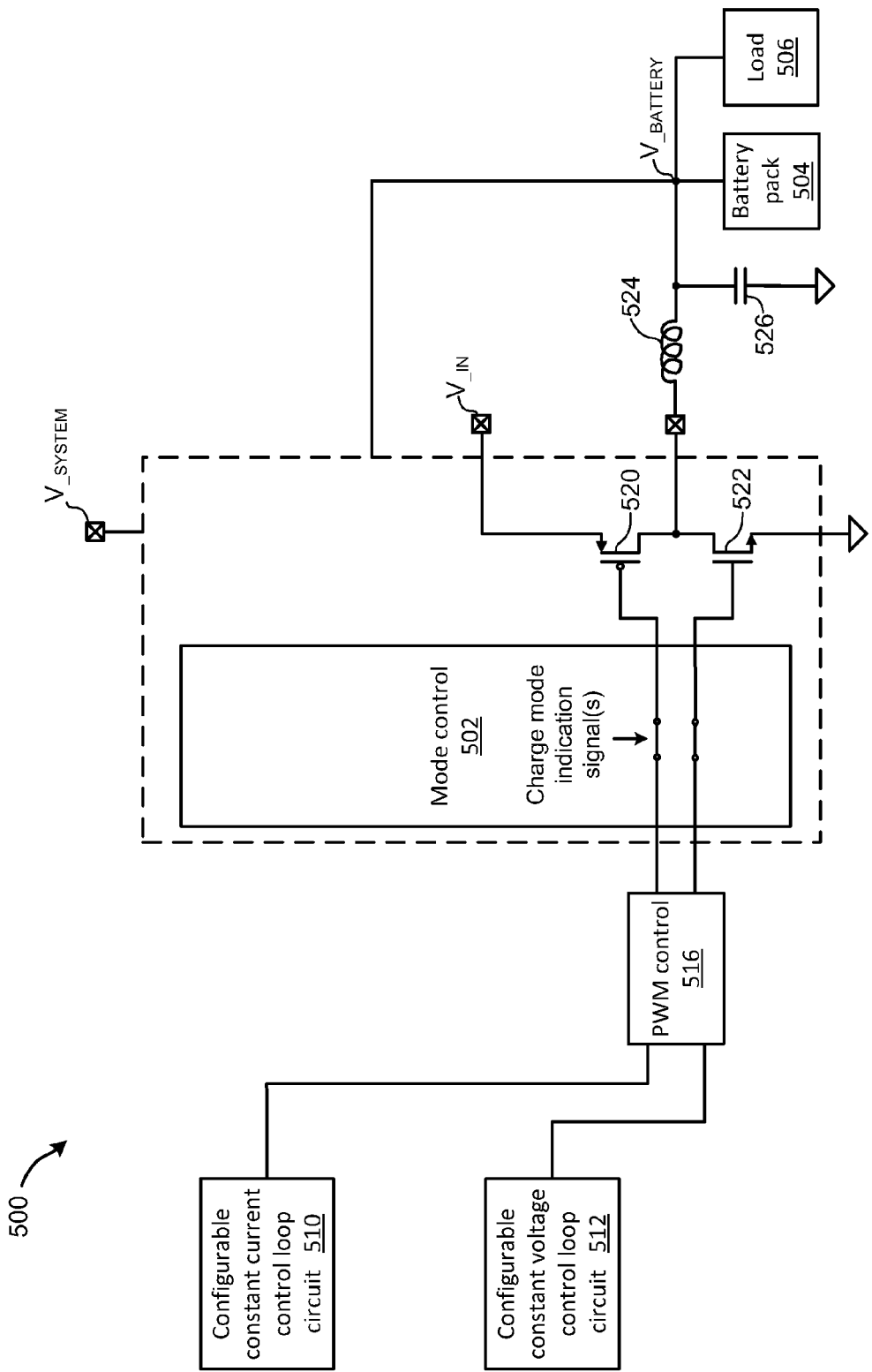
FIG. 5 illustrates the exemplary multimode battery charger circuit of FIG. 3 configured to operate as a switch mode charger.

FIG. 5 illustrates the exemplary multimode battery charger circuit of FIG. 3 configured to operate as a switch mode charger 500. In this embodiment, the mode control circuitry 502 enables the signal path of the internal/external output transistors 520 and 522 for charging of battery pack 504 and/or provision of power to a system load 506. In particular, and in accordance with one or more charge mode indication signals, the mode control circuitry 502 enables (e.g., by closing one or more switches) charging control voltages from the PWM control circuit 516 to be received at the gates of output transistors 520 and 522.

Further, the mode control circuitry 502 may configure (e.g., by generating appropriate gate control voltages for a plurality of additional switches) the configurable constant current control loop circuit 510 and configurable constant voltage control loop circuit 512 such that one or more control voltages generated by these circuits are able to effectively control the PWM control circuit 516 and output transistors 520 and 522. In the illustrated embodiment, the linear gate driver and pass transistor (not shown) used in the linear mode are disabled. As previously described, the inductor 524 and capacitor 526 act as a filter between the charging circuitry and battery pack 504.

Although not separately illustrated, a variety of additional circuitry and features may be included in battery charger circuitry according to the present disclosure. As noted, the disclosed multimode battery charger circuitry may be part of a PMU that integrates most or all of the key portable power components and functionality. Such components and functionality might include, by way of example, wall and USB charging for the main battery(ies), automatic charger source switchover, battery presence detection circuitry, battery temperature monitoring, a die temperature regulation loop, high-efficiency synchronous buck regulators, high-performance programmable Low Dropout (LDO)regulators, a backup battery charger, an RTC, programmable current sources for driving signal LEDs, GPIO ports, a fuel gauge, etc. The PMU functions can be controlled through a serial bus interface or the like, whereby an external host controller can access desired registers to read or program the internal blocks.

Figure 6:
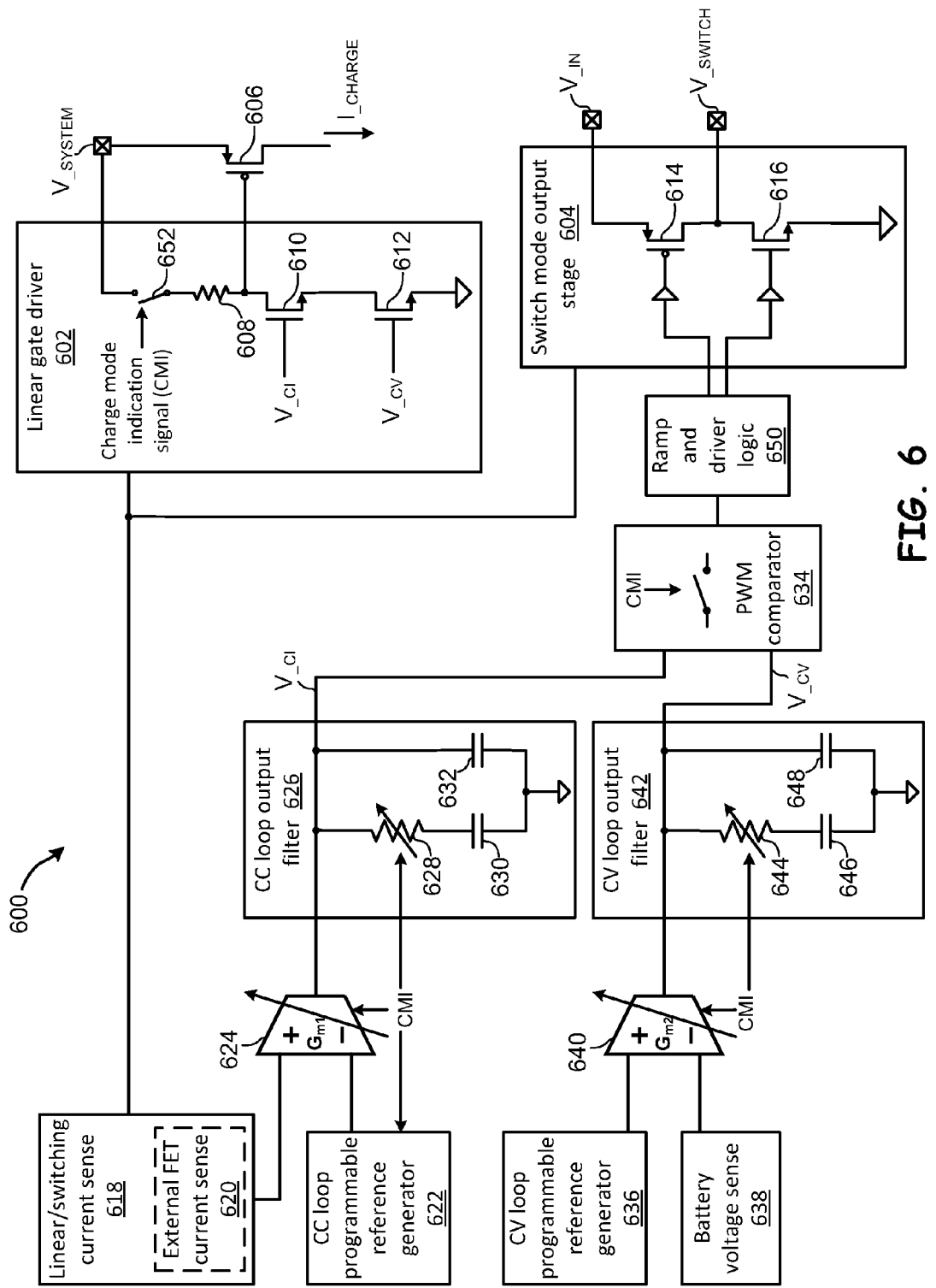
FIG. 6 is a circuit diagram illustrating details of an exemplary multimode battery charger.

FIG. 6 is a circuit diagram illustrating details of an exemplary multimode battery charger 600. In the illustrated embodiment, a plurality of switches (controlled by one or more charge mode indication signals or "CMI") and other configurable circuit elements operate to support switch modes and linear modes of charging. Various such elements may be incorporated, for example, in the mode control circuitry 302.

Referring first to a linear mode of operation, the linear gate driver 602 generates an output voltage that is provided to the gate of pass transistor 606, which is coupled between a system level supply ($V_{\_SYSTEM}$) and battery(ies) (not shown). When enabled, a charging current $I_{\_CHARGE}$ flows through pass transistor 606. In the illustrated embodiment, the linear gate driver 602 may be enabled and disabled through a switch 652 coupled between $V_{\_SYSTEM}$ and a first end of resistor 608, the switch being controlled by a charge mode indication signal. In operation, the switch 652 is open when a linear charge mode is enabled. The second end of the resistor 608 is coupled to the drain of transistor 610, as well as the gate of the pass transistor 606. The source of the transistor 610 is coupled to the drain of transistor 612, while the source of transistor 612 is coupled to ground. When transistors 610 and 612 are enabled by control voltages $V_{\_CI}$ and $V_{\_CV}$ at their respective gates, the voltage at the gate of pass transistor 606 is pulled low, enabling the desired charging current $I_{\_CHARGE}$.

When the multimode battery charger 600 is configured for switch mode charging operations, the switch mode output stage 604 operates as generally described above. In the illustrated embodiment, output transistors 614 and 616 are coupled in series between an adapter power port (providing a voltage $V_{\_IN}$) and ground. The common node between these transistors establishes a voltage $V_{\_SWITCH}$ that (through a low pass filter) governs battery charging.

Linear/switching current sense circuitry 618 is coupled to both the linear gate driver 602 and the switch mode output stage 604 to monitor charging currents under various modes of operation. In embodiments that utilize an external pass transistor, external FET current sense circuitry 620 may also be provided. Such circuitry may utilize an external sense resistor (not shown) to sense charge current.

In operation, the linear/switching current sense circuitry 618 provides an output voltage that is proportional to a dc charge current in the relevant mode of operation. This voltage is provided at the positive input of a transconductance amplifier 624. In the illustrated embodiment, the output of a constant current (CC) loop programmable reference generator 622 is coupled to the negative input of the transconductance amplifier 624. The voltage level at the output of the CC loop programmable reference generator 622 may be set, for example, to correspond to a charge current limit. The transconductance amplifier 624 produces an output current that is proportional to the difference between the voltages at its input.

The output of the transconductance amplifier 624 is provided to a CC loop output filter 626 comprised of a variable resistor or potentiometer 628 coupled in series with a capacitor 630. A capacitor 632 is coupled between the output of the transconductance amplifier 624 and ground in parallel with the potentiometer 628 and capacitor 630. Current provided by the output of the transconductance amplifier 624 is thereby utilized to generate the control voltage $V_{\_CI}$ at the output of the CC loop output filter 626.

Similarly, the output of a constant voltage (CV) loop programmable reference generator 636 is coupled to the positive input of a transconductance amplifier 640, while the negative input of the transconductance amplifier 640 is coupled to the output of a battery voltage sense circuit 638 which monitors the voltage at the charging terminal of a battery coupled to the multimode battery charger 600. The CV loop programmable reference generator 636 may be programmed, for example, to reflect the type and/or number of battery cells coupled to the multimode battery charger 600. The output of the transconductance amplifier 640 is provided to a CV loop output filter 642 comprised of a variable resistor or potentiometer 644 coupled in series with a capacitor 646. A capacitor 648 is coupled between the output of the transconductance amplifier 640 and ground in parallel with the potentiometer 644 and capacitor 646. Current provided by the output of the transconductance amplifier 640 is thereby utilized to generate the control voltage $V_{\_CV}$ at the output of the CV loop output filter 642.

During switch mode charging operations, the outputs ($V_{\_CI}$ and $V_{\_CV}$) of the CC loop output filter 626 and CV loop output filter 642 are coupled to the inputs of a PWM comparator 634, which produces a series of pulses having pulse widths that are modulated over time to control battery charging rate. In particular, the output of the PWM comparator 634 is coupled to ramp and driver logic 650 for use in driving the gate voltages of output transistors 614 and 616.

In the illustrated embodiment, various components of the exemplary multimode battery charger 600 are configurable via one or more charge mode indication signals to support a plurality of linear modes of operation and a plurality of switch modes of operation. In one exemplary embodiment in which Li-ion battery charging is performed, a two-phase approach may be utilized. In a first phase typically referred to as the constant current phase, the battery may be charged at a maximum recommended (or "fast") charging rate. When the battery reaches a specified voltage, charging is switched to a second phase, or constant voltage phase, in which only enough current is provided to maintain the voltage of the battery at the specified voltage. Typically, there is a gradual decay in the charge current profile during this phase as the battery approaches maximum charge.

Figure 7:
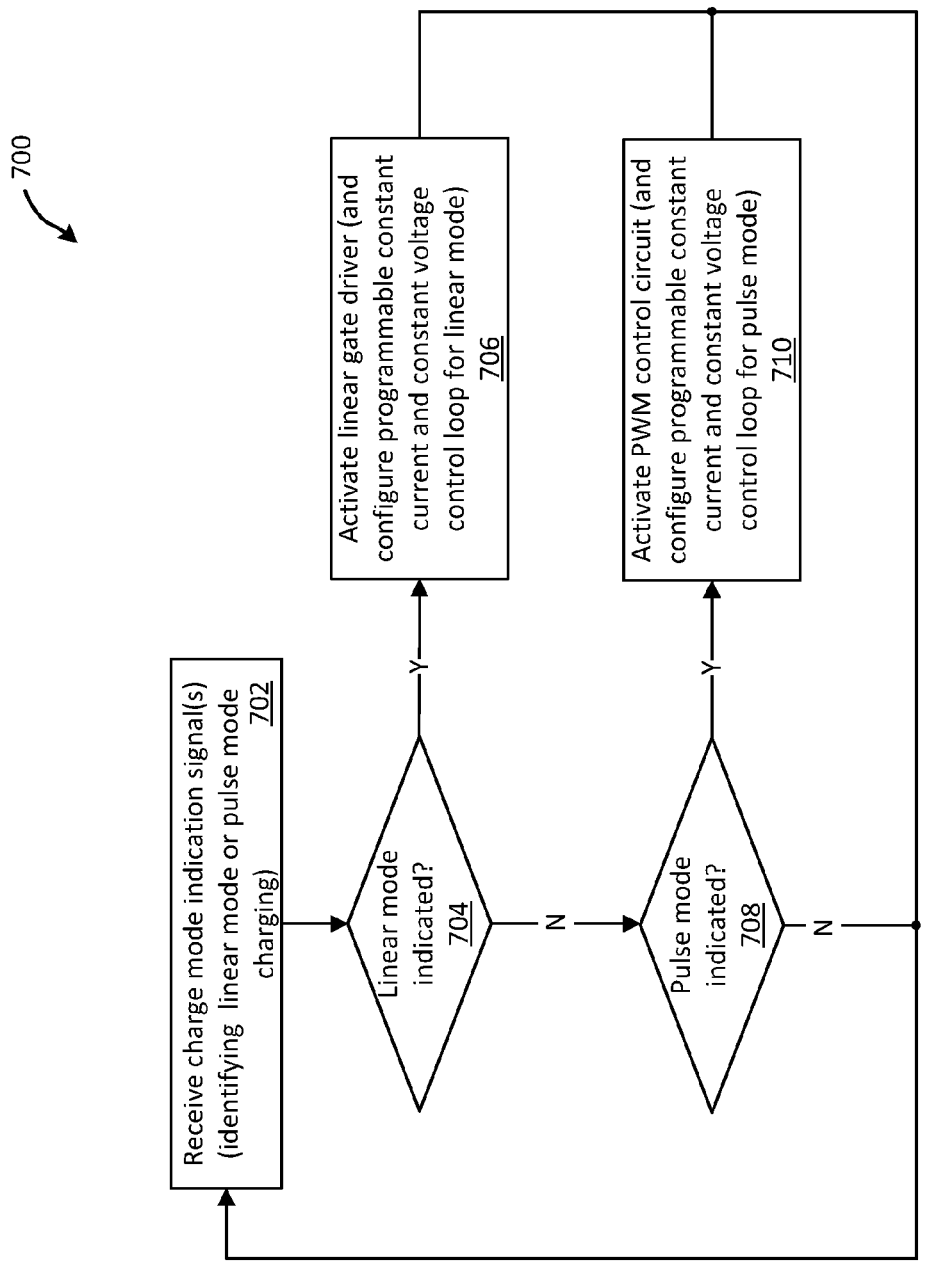
FIG. 7 is an operational flow diagram illustrating an exemplary method for multimode-enabled charging of a battery.

FIG. 7 is an operational flow diagram illustrating an exemplary method 700 for multimode-enabled charging of a battery. The method may be performed through use of a circuit having both linear mode and pulse mode charging capabilities and a power port for receiving power from an external source. The method commences following receipt of a charge mode indication signal(s) identifying linear mode or pulse mode charging (702). In various exemplary embodiments, a charge mode indication signal may be fixed at the time of manufacture, generated by sensing or like circuitry, etc. If linear mode is indicated (704), a linear gate driver coupled to a pass transistor is activated (706) (e.g., by mode control circuitry). Programmable constant current and constant voltage control loops may also be configured for use in a desired linear mode of charging.

If pulse mode charging is indicated (708), a PWM control circuit coupled to one or more output transistors is activated (710) (e.g., by mode control circuitry).

Programmable constant current and constant voltage control loops may also be configured for use in a desired pulse mode of charging. Further, the state of the charge mode indication signal(s) may be continuously monitored to enable real-time or near real-time modifications to desired charge modes.

As may be used herein, the term "associated with", includes direct and/or indirect association of separate items and/or one item being embedded within another item. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to" or "operably coupled to" indicates that an item includes one or more of power connections, input(s), output(s), etc., to perform, when activated, one or more its corresponding functions and may further include inferred coupling to one or more other items.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

As may also be used herein, the terms "processing module", "processing circuit", "processor" and/or "processing unit" may be a single processing device or a plurality of processing devices. Such a processing device may be a microprocessor, micro-controller, digital signal processor, micro-computer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of the present disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed subject matter. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the claimed subject matter. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones. While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contrary, signals to, from, and/or between elements in a figure presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A multimode battery charger circuit comprising:
a constant current control loop circuit including a programmable reference generator;
a constant voltage control loop circuit including a programmable reference generator;
a linear gate driver coupled to the constant current control loop circuit and the constant voltage control loop circuit, the linear gate driver having an output to provide a voltage to a gate of a pass transistor during linear mode charging operations, the pass transistor further coupled to a battery pack or system load;
a pulse width modulation (PWM) control circuit coupled to the constant current control loop circuit and the constant voltage control loop circuit, the PWM control circuit having an output to control power provided by a plurality of output transistors coupled in series during switch mode charging operations, the plurality of output transistors further coupled to the battery pack or the system load; and
mode control circuitry coupled to the linear gate driver and the PWM control circuit, the mode control circuitry configured to selectively enable the linear gate driver or the PWM control circuit in accordance with a charge mode indication signal.

2. The multimode battery charger circuit of claim 1, wherein the constant current control loop circuit and the constant voltage control loop circuit are configurable through their respective programmable reference generator to support a plurality of linear modes of operation and a plurality of switch modes of operation.

3. The multimode battery charger circuit of claim 1, the mode control circuitry further configured to configure the constant current control loop and the constant voltage control loop circuit to support one of a linear mode of operation and a switch mode of operation in accordance with the charge mode indication signal.

4. The multimode battery charger circuit of claim 1, the mode control circuitry further configured to disable the linear gate driver when the PWM control circuit is enabled, and disable the PWM control circuit when the linear gate driver is enabled.

5. The multimode battery charger circuit of claim 1 manufactured in a single integrated circuit device.

6. The multimode battery charger circuit of claim 1, wherein the charge mode indication signal corresponds to a particular battery arrangement and type.

7. A device comprising:
a power port to receive power from an external source;
a battery terminal for charging a battery;
a multimode battery charger circuit coupled to the power port and the battery terminal, the multimode battery charger circuit including:
a constant current control loop circuit including a programmable reference generator;
a constant voltage control loop circuit including a programmable reference generator;
a linear gate driver coupled to the constant current control loop circuit and the constant voltage control loop circuit, the linear gate driver having an output to provide a voltage to a gate of a pass transistor during linear mode charging operations, the pass transistor further coupled to a battery pack or system load;
a pulse width modulation (PWM) control circuit coupled to the constant current control loop circuit and the constant voltage control loop circuit, the PWM control circuit having an output to control power provided by a plurality of output transistors coupled in series during switch mode charging operations, the plurality of output transistors further coupled to the battery pack or the system load; and
mode control circuitry coupled to the linear gate driver and the PWM control circuit, the mode control circuitry configured to selectively enable the linear gate driver or the PWM control circuit in accordance with a charge mode indication signal.

8. The device of claim 7, wherein the constant current control loop circuit and the constant voltage control loop circuit are configurable through their respective programmable reference generator to support a plurality of linear modes of operation and a plurality of switch modes of operation.

9. The device of claim 7, the mode control circuitry further configured to configure the constant current control loop and the constant voltage control loop circuit to support one of a linear mode of operation and a switch mode of operation in accordance with the charge mode indication signal.

10. The device of claim 7, the mode control circuitry further configured to disable the linear gate driver when the PWM control circuit is enabled, and disable PWM control circuit when the linear gate driver is enabled.

11. The device of claim 7, wherein the charge mode indication signal corresponds to a particular battery arrangement and type.

12. The device of claim 7, further including a battery coupled to the battery terminal.

13. The device of claim 7, wherein the multimode battery charger circuit is formed on a common substrate.

14. The device of claim 7, wherein the pass transistor is coupled in series between the power port and a battery pack terminal, the pass transistor having a gate coupled to the output of the linear gate driver.

15. A method for charging a battery coupled to a circuit having both linear mode and pulse mode charging capabilities and a power port for receiving power from an external source, the method comprising:
receiving a charge mode indication signal corresponding to one of the linear mode and the pulse mode charging; and based at least in part on the charge mode indication signal, enabling one of the linear mode and the pulse mode charging, wherein enabling the linear mode includes activating a linear gate driver to control a pass transistor that provides a first charging path from the power port to a battery, and wherein enabling the pulse mode includes activating a PWM control circuit separate from the linear gate driver to control a plurality of output transistors coupled in series that provide a second charging path from the power port through a passive low-pass LC filter to a battery.

16. The method of claim 15, wherein the linear gate driver operates to establish a voltage at a gate of a pass transistor coupled in series between the power port and the battery.

17. The method of claim 16, wherein the pass transistor is a PFET.

18. The method of claim 17, wherein the PFET is formed on a common substrate with the linear gate driver.

19. The method of claim 18, wherein control signals from the PWM control circuit are utilized to establish a voltage at a gate of at least one output transistor coupled between the power port and the battery.

20. The method of claim 19, wherein the at least one output transistor is formed on a common substrate with the PWM control circuit.

* * * * *